3,355,419
STABILIZED CIS 1,4 POLYBUTADIENE
Wendell S. Cook, Canal Fulton, Ohio, assignor to The Firestone Tire & Rubber Company, Akron, Ohio, a corporation of Ohio
No Drawing. Filed Oct. 18, 1963, Ser. No. 317,149
25 Claims. (Cl. 260—45.9)

ABSTRACT OF THE DISCLOSURE

Rubber of polybutadiene or copolymer of butadiene with a minor amount of styrene or other comonomer, polymerized with lithium-based catalyst, is stabilized with a mixture of three components, as follows:
(1) 2,4-dialkyl-p-cresol or other 2,4,6-trialkylphenol;
(2) mixed alkyl aryl triphosphite;
(3) 2-aralkyl-4,6-dialkylphenol; alkyl-substituted diphenyl phenol; multi-t-alkylphenol; 2,6-bis(2'-hydroxy-3'-t-alkyl-5'-alkylbenzyl)-4-alkylphenol; cycloalkylated phenol, cresol or xylenol; N-acyl-p-aminophenol or 2,2'-alkylidene-bis(4-alkyl-6-t-alkylphenol).

*The specification*

This invention relates to the stabilization of polymeric materials produced by the polymerization, by means of lithium-based catalysts, of butadiene alone or by mixtures of butadiene with minor proportions of other monomeric substances which are copolymerizable therewith and whose presence in the polymeric chain does not disturb the essential character of the butadiene polymer configuration. Butadiene when polymerized alone in the presence of lithium-based catalysts results in polymers exhibiting, by infra-red technique 25 to 85 percent cis-1,4-structure and substantially 6 to 15 percent 1,2-structure, the balance being trans-1,4-structure. When butadiene is polymerized with these catalysts in the presence of minor proportions of other unsaturated monomers, the portions of the polymeric chains derived from the butadiene retain this same essential character.

While in many instances the butadiene polymers being discussed and with which the invention is concerned are polybutadienes, it is to be understood that these polymers include in addition to homopolymers of butadiene, also copolymers of butadiene with vinyl monomers such as styrene, o-, m- and p-methyl styrene, α-methyl styrene, the various dimethyl styrenes, indene, vinyl pyridine, vinyl naphthalene, isobutene, acrylonitrile, allyl benzene, allyl toluene, allyl naphthalene, stilbene, methyl stilbene, 1,3-diphenyl-1-butene, isoprene, triphenylethylene, halogen-substituted derivatives of the foregoing and the like. In the case of such copolymers, the polymers contain from about 5 percent to 50 percent by weight vinyl monomer and correspondingly from about 95 percent to 50 percent by weight butadiene-1,3 and are highly unsaturated polymers. In many instances, the comonomers may have some tendency to form block copolymers with the butadiene, i.e., to enter the polymeric chains in a non-statistical distribution along the length of the chain. Such products are useful in many applications; however, if it is desired to obtain polymers in which the monomer residues are statistically distributed in random configuration, the concentration of the more rapidly polymerizing monomer may be kept at a low and constant value by charging the monomers initially with the more rapidly polymerizing monomer at a low concentration with respect to the other monomers, and adding the further amounts of the more rapidly polymerizing monomer incrementally during the polymerization. For example, styrene polymerizes more slowly than butadiene with lithium-based catalysts; thus, if it is desired to obtain a polymer of uniform configuration containing say 20 percent of styrene statistically distributed along the chains, there will be charged initially a mixture of 70 percent styrene and 30 percent butadiene. As the polymerization proceeds, the butadiene is replenished continuously or at frequent intervals by addition of butadiene or a mixture of butadiene and styrene in the proportions desired in the final polymer. Empirically it has been found that this result may be achieved by feeding butadiene alone at a rate such as to keep the reaction pressure constant at its original value.

There may be included in a polymerization recipe for a butadiene polymer which otherwise would undesirably flow at ordinary storage or handling temperatures, a trace amount of a multifunctional monomeric compound capable of adding to a butadiene and/or its polymeric sequences under polymerization conditions. The amount employed will vary to some extent from about 0.025 to 0.4 part of the multifunctional monomeric compound depending on the one hand upon the inherent viscosity of the butadiene polymers and consequent magnitude of the flow problem, and on the other hand upon the concentration of the multifunctional monomeric compound which will produce substantial gel in the polymer, gel being highly undesirable in such polymers. Although divinyl benzene for economic reasons is a preferred multifunctional monomeric compound, multifunctional monomeric compounds generally which are effective include without restriction the other multifunctional aromatic compounds of which trivinyl benzene, tetravinyl benzene, divinyl xylenes, divinyl anthracene, divinyl naphthalene, and divinyl durene are representative, the multifunctional acetylenes of which divinyl acetylene, divinyl diacetylene, divinyl triacetylene, diallyl acetylene and diallyl diacetylene are representative, 4,4'-divinyl azobenzene, 4,4'-divinylphenylether, 4,4'-divinylphenyl sulfide, 4,4'-divinylphenyl disulfide, 4,4'-bis(vinylphenyl) methane, 4,4'-bis(vinylphenyl) ethane, 4,4'-bis(vinylphenyl) amine, diallyl, azodiallyl, vinyl phosphate, diallyl phosphate, triallyl phosphate and ethylene dimethacrylate.

The polymerization may be carried out in bulk, in processes in which the butadiene and other monomers are brought into contact with the catalysts in the absense of any solvents, or in the presence of solvents. The polymerization may also be carried out in the presence of plasticizing oils or of carbon black or other pigments designed to remain in the final product, or these materials may be added to the polymerization solution at the close of the reaction. Thus, 20, 30, 40 or even more parts of carbon black, or of plasticizing oils may be incorporated in the polymer in this manner.

The linear polybutadienes of this invention are typically water white and contain no more than a few tenths of a percent of gel. The low level of catalyst required for producing the polymerization results in no heavy metal residue in the polymer. The polymer is therefore relatively free of material that would tend to discolor or cause deterioration upon aging.

The polybutadienes of linear molecular structure are formed, suitably at a temperature of 0 to 100° C., using about 0.0001 to about 0.1 gram of active lithium as a lithium-based catalyst per 100 grams of butadiene-1,3 monomer. Suitable hydrocarbon solvents for the butadiene or its polymer can be used.

The lithium-based catalyst can be metallic lithium or an organolithium compound in which the lithium exerts a sufficiently strong reducing action to displace hydrogen from water. "Organolithium compounds," as used herein, include the various lithium hydrocarbons, i.e., hydrocarbons in which one or more hydrogen atoms have been replaced by lithium, and adducts of lithium with polycyclic aromatic compounds. Suitable lithium hydrocarbons are, for instance, alkyllithium compounds such as methyllithium, ethyllithium, butyllithium, amyllithium, hexyllithium, 2-ethyl-hexyllithium and n-hexadecyllithium. In addition to the saturated aliphatic lithium compounds, unsaturated compounds are also suitable such as allyllithium, methallyllithium and the like. Aryl-, alkaryl- and aralkyl-lithium compounds such as phenyllithium, the several tolyl- and xylyl-lithiums, alpha- and beta-naphthyl-lithium and the like are also suitable. Mixtures of the various hydrocarbon lithium compounds are also suitable. For instance, a catalyst can be prepared by reacting an initial hydrocarbon lithium compound successively with an alcohol and with an olefin such as propylene (i.e., a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene dilithium compounds such as methylene dilithium, ethylene dilithium, trimethylene dilithium, pentamethylene dilithium, hexamethylene dilithium, decamethylene dilithium, octadecamethylene dilithium and 1,2-dilithium propane. Other suitable polylithium hydrocarbons are polylithium aryl, aralkyl and alkaryl compounds such as 1,4-dilithium benzene, 1,5-dilithium naphthalene, 1,2-dilithium-1,3-triphenyl propane, and the like. Tri- and higher lithium hydrocarbons are also suitable, such as 1,3,5-trilithium pentane or 1,3,5-trilithium benzene. Likewise, there may be employed the lithium-polynuclear aromatic hydrocarbon adducts produced by simply reacting lithium metal with naphthalene, anthracene and the like polynuclear aromatic hydrocarbons. The hydrocarbon acquires a negative charge without losing any of its hydrogens, and serves as the anion (the lithium losing an electron to serve as the cation) of the salt. It should be understood that metallic lithium or the various lithium compounds may be used either alone, or in any combination as mixtures with each other.

Polymerization by a lithium-based catalyst is described in British Patent 817,693. This patent discloses polymers of butadiene with substantially 30 to 40% content of cis-1,4-structure.

Analysis of polybutadienes by infra-red technique is described in Analysis of Polybutadienes and Butadiene-Styrene Copolymers by Infrared Spectroscopy by John L. Binder in Analytical Chemistry, vol. 26, No. 27, December 1954, and analyses referred to herein were determined by that method.

The butadiene polymers to which this invention relates are subject to decomposition. Both heat and light form a surface skin or gel which turns to various shades of yellow or brown. Such decomposition affects the color and physical properties of the raw polymers, the milling of the raw polymers, and the processing of the compounded polymers, as well as the physical properties of the unaged and aged vulcanizates.

Various stabilizers have been proposed for use with butadiene polymers. Some of these cause discoloration or do not prevent discoloration which would occur in their absence. Some of the stabilizer mixtures of this invention do not discolor and prevent or retard discoloration in the polymers upon oven aging or natural light aging, and others produce or permit only slight discoloration. Also the stabilizers of this invention prevent or substantially inhibit the formation of gel.

The stabilizing action of this invention is dependent upon the use of three different components, as follows:

*Component 1.*—A compound having the formula

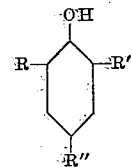

in which

R is an aliphatic hydrocarbon radical containing 1 to 12 carbon atoms,

R' is an aliphatic hydrocarbon radical containing 4 to 12 carbon atoms of the class consisting of tertiary-alkyl and alicyclic radicals, and R" is an n-alkyl radical containing 1 to 4 carbon atoms.

Compounds utilizable as Component 1 include, for example, 2,6-di-t-butyl-4-methylphenol
2,6-di-t-octyl-4-methylphenol
2,6-di-t-nonyl-4-ethylphenol
2,6-dicyclohexyl-4-propylphenol
2,6-dicyclopentyl-4-butylphenol
2,6-dicyclohexyl-4-methylphenol
2,6-diisobornyl-4-methylphenol
2,6-diisobornyl-4-propylphenol
2,4-dimethyl-6-alpha-methylcyclohexylphenol
2,4-dimethyl-6-isobornylphenol
2,4-dipropyl-6-cyclohexylphenol
2-methyl-4-butyl-6-cyclohexylphenol
2-ethyl-4-propyl-6-t-octylphenol
2-methyl-4,6-di-t-butylphenol
2-methyl-4,6-di-t-octylphenol

*Component 2.*—A phosphite of the formula

in which

R is an alkyl group containing 4 to 12 carbon atoms;

R' is phenyl or mono-alkylphenyl in which the alkyl group contains 1 to 4 carbon atoms; and R" is an alkyl group containing 4 to 12 carbon atoms or phenyl or mono-alkylphenyl in which the alkyl group contains 1 to 4 carbon atoms.

Representative compounds utilizable as Component 2 include:

Didecyl phenyl phosphite
Dioctyl phenyl phosphite
Dinonyl phenyl phosphite
Dibutyl phenyl phosphite
Dihexyl phenyl phosphite
Didecyl 4-methylphenyl phosphite
Didecyl 4-butylphenyl phosphite
Dodecyl diphenyl phosphite
Octyl diphenyl phosphite
Octyl di(4-methylphenyl) phosphite
Butyl diphenyl phosphite

*Component 3.*—A compound from the class consisting of:

(a) Compounds having the formula

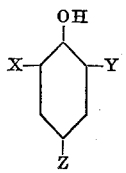

in which X is a primary or secondary phenylalkyl radical having 1 to 3 carbon atoms in the alkyl group, Y is a tertiary-alkyl radical having 4 to 12 carbon atoms, and Z is a primary or secondary alkyl radical having 1 to 4 carbon atoms.

Representative materials utilizable as Component 3(a) are products such as those known commerically as Wingstay V and Cyanox LF (each of which is a mixture of alkylated styrenated phenols) and compounds of which the following are illustrative:

2-t-butyl-4-methyl-6-(alpha-methylbenzyl) phenol
2-t-octyl-4-n-butyl-6-(alpha-methylbenzyl) phenol
2-t-octyl-4-methyl-6-(alpha-methylbenzyl) phenol
2-(alpha-methylbenzyl)-4-isopropyl-6-t-butyl phenol
2-(alpha-methylbenzyl)-n-butyl-6-t-butyl phenol
2-(alpha-methylbenzyl)-4-ethyl-6-octyl phenol (b) Compounds having the formula

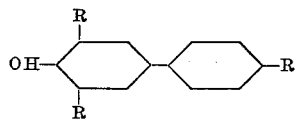

in which each R is a t-alkyl group of 4 to 12 carbon atoms, which groups may be the same or different.

Representative of the compounds utilizable as component 3(b) are DuPont Zalba, and, for example, the following:

2,6-di-t-butyl-4(4'-t-butylphenyl) phenol
2,6-di-t-amyl-4(4'-t-amylphenyl) phenol
2,6-di-t-octyl-4(4'-t-octylphenyl) phenol
2,6-di-t-nonyl-4(4'-t-nonylphenyl) phenol
2,6-di-t-dodecyl-4(4'-t-dodecylphenyl) phenol (c) A mixture of compounds, each having the formula

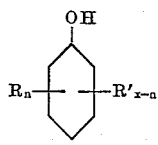

in which $x$ is selected from the group consisting of 2 and 3;
$n$ is selected from the group consisting of 0, 1, 2 and 3, but does not exceed the value of $x$;
R is selected from the group consisting of t-butyl and t-amyl; and
R' is selected from the group consisting of t-octyl and t-nonyl;
R and R' being attached to the benzene ring in the 2, 4 and 6 positions; and a major portion of said mixture being composed of tri-t-alkylated phenols in which two of said three alkyl groups are selected from the class consisting of t-octyl and t-nonyl groups, and in which the third t-alkyl group is selected from the class consisting of t-butyl and t-amyl groups.

The materials usable as Component 3(c) include, for example, the product known commercially as Wingstay T, and also the products and mixtures covered by the formula for Component 3(c) and disclosed in the examples of British Patent 758,474, including reaction products of phenol, diisobutylene and isobutylene in the following ratios: 1:2:1, 1:1:2, 1:1.25:1.75, 1:1.5:1.5, 1:1.75:1.25, 1:1.5:1.75, 1:2:1.25, 1:2:1.5 and 1:2:0; the reaction product of nonylphenol and isobutylene in the ratio of 1:2; the reaction product of phenol, tripropylene and isobutylene in the ratio of 1:1:2; and also 2,4-di-t-octyl-6-t-butylphenol and 2,6-di-t-butyl-4-t-octylphenol.

(d) Compounds having the formula

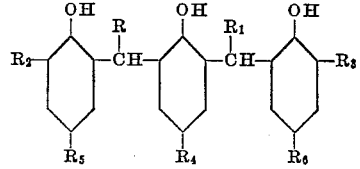

in which

R and $R_1$ are from the class consisting of hydrogen and alkyl groups containing 1 to 3 carbon atoms, and may be the same or different;
$R_2$ and $R_3$ are each a t-alkyl group containing 4 to 12 carbon atoms, and may be the same or different;
$R_4$ is from the class consisting of hydrogen and alkyl groups containing 1 to 4 carbon atoms; and
$R_5$ and $R_6$ are each an alkyl group containing 1 to 4 carbon atoms, and may be the same or different.

The product known as AO 80 may be used as Component 3(d), as also may compounds such as the following:

2,6-bis(2'-hydroxy-3'-t-butyl-5'-methylbenzyl)-4-methylphenol
2,6-bis(2'-hydroxy-3'-t-octyl-5'-ethylbenzyl)-4-ethylphenol
2,6-bis(2'-hydroxy-3'-t-dodecyl-5'-butylbenzyl)-4-methylphenol
2,6-bis(2'-hydroxy-3'-t-undecyl-5'-propylbenzyl)-4-propylphenol
2,6-bis(2'-hydroxy-3'-t-nonyl-5'-methylbenzyl)-4-butylphenol
2,6-bis(2'-hydroxy-3'-t-octyl-5'-methylbenzyl) phenol
2,6-bis(2'-hydroxy-3'-t-octyl-5'-ethylbenzyl) phenol
2,6-bis(2'-hydroxy-3'-t-nonyl-5'-propylbenzyl) phenol
2,6-bis(2'-hydroxy-3'-t-butyl-5'-ethylbenzyl)-4-propylphenol
2,6-bis(2'-hydroxy-3'-t-octyl-5'-ethylbenzyl)-4-methylphenol (e) Compounds of the class consisting of cyclohexylated, cyclopentylated, alpha-methylcyclohexylated and alpha-methylcyclopentylated phenols, cresols and xylenols, and mixtures thereof in which there are substituents in the 2-, 4- and 6-positions, and especially a mixture in which there are substituents in substantially all of said positions.

Representative compounds utilizable as Component 3(e) are products such as that known commercially as Nonox WSL, a mixture of alpha-methylcyclohexylated p-cresols, and Component 3(e) includes such compounds as:

4-methyl-2,6-di(alpha-methylcyclohexyl) phenol
2-methyl-4,6-di(alpha-methylcyclohexyl) phenol
2,4-dimethyl-6-(alpha-methylcyclohexyl) phenol
2,4-dimethyl-6-(alpha-ethylcyclohexyl) phenol
2,6-dimethyl-4-(alpha-methylcyclohexyl) phenol
2-alpha-methylcyclohexyl-4,6-dimethylphenol
2-cyclohexyl-4,6-dimethylphenol
2-alpha-methylcyclopentyl-4,6-dimethylphenol
2-cyclopentyl-4,6-dimethylphenol (f) N-acyl-p-aminophenols in which the acyl group contains 4 to 18 carbon atoms.

Compounds representative of Component 3(g) are Succonox 12 and such compounds as, for example:

N-stearoyl-p-aminophenol
N-(n-caproyl)-p-aminophenol
N-(n-valeroyl)-p-aminophenol and (g) Compounds having the formula

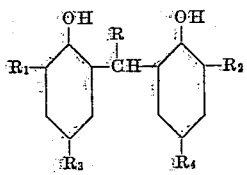

in which

R is from the class consisting of hydrogen and alkyl groups containing 1 to 3 carbon atoms;

$R_1$ and $R_2$ are each a t-alkyl group containing 4 to 12 carbon atoms, which may be the same or different; and $R_3$ and $R_4$ are each an alkyl group containing 1 to 4 carbon atoms, and may be the same or different.

Component 3(g) includes products known as CAO 14, CAO 5, AO 2246 and Nonox WSP. It also includes compounds such as the following:

2,2'-methylene-bis(4-methyl-6-t-butylphenol)
2,2'-ethylidene-bis(4-ethyl-6-t-octylphenol)
2,2'-butylidene-bis(4-butyl-6-t-dodecylphenol)
2,2'-propylidene-bis(4-methyl-6-t-nonylphenol)
2,2'-methylene-bis(4-methyl-6-alpha-methylcyclohexylphenol)
2,2'-butylidene-bis(4-ethyl-6-alpha-methylcyclohexylphenol)
2,2'-methylene-bis(4-propyl-6-t-butylphenol)
2,2'-methylene-bis(4-methyl-6-t-undecylphenol)

It is to be understood that mixtures of compounds included within the class of Component 3 may be used.

Compounds belonging to the class of Component 3(a) are non-discoloring, i.e., when subjected to heat and light such as that to which they were subjected in tests to be described, they did not discolor or prevented discoloration which would otherwise occur. Compounds of the other groups discolor only very slightly or permit only slight discoloration. The latter are usable in tinted or colored rubber compounds, whereas the others are usable in white compounds.

The total amount of the three components used will be from about 0.15 to 2.5 parts per 100 parts of the polymer. Usually, more of Component 2 will be used than of Component 1 or Component 3. The amounts of the various components used, per 100 parts of the polymer will be substantially:

| Component: | Part |
|---|---|
| 1 | 0.05 to 0.5 |
| 2 | 0.05 to 1.0 |
| 3 | 0.05 to 1.0 |

The following test results illustrate the synergistic effect of the use of the three components in polybutadiene made by solution-polymerization with butyllithium or equivalent lithium-based catalyst and having the following or an equivalent structure as determined by infra-red technique: substantially 35 to 37 percent cis-1,4-structure and substantially 8 to 10 percent 1,2-structure, the balance being trans-1,4-structure.

The test results compare the effect of different stabilizer mixtures on the polybutadiene after being subjected to aging for 2 days in an oven at 100° C. with air circulation, and after being subjected to sunlight for 30 days. Comparisons of the results show the beneficial synergistic effect on the color of the final products and on the amount of gel produced. Polymers with a gel content of over about 5 percent are difficult to process.

The amounts of stabilizer are given as parts per 100 parts of the polymer. The amount of gel is recorded in percent, based on the total polymer. Colors are reported, utilizing the following abbreviations:

Al=Almost
Cr=Cream
Dk=Dark
Gr=Gray
Lt=Light
Sl=Slight
Tr=Trace (almost imperceptible)
V=Very
WW=Water White
Yel=Yellow The various chemicals and products used in the stabilizer mixtures are identified as follows:

DBPC stands for di-t-butyl-p-cresol
DDPP stands for didecyl-phenyl-phosphite
Cyanox LF is a mixed alkylated styrenated phenol which for the purpose of this disclosure is considered to be a reaction product prepared according to British Patent 818,035 and is considered to be a mixture of 2-(alpha-methylbenzyl)-4-methyl-6-t-octyl phenol and 2-t-butyl-4-methyl-6-alpha-methylbenzyl phenol.
Du Pont Zalba is tri-t-butyl-p-phenylphenol.
Wingstay T is made according to British Patent 758,474, and for the purpose of this disclosure it is considered to be the reaction product of phenol, diisobutylene and isobutylene reacted in the ratio of 1:2:1.
AO 80 is 2,6-bis(2'-hydroxy-3'-t-butyl-5'-methylbenzyl)-4-methylphenol.
Nonox WSL is essentially a mixture of alpha-methyl-cyclohexylated cresols and xylenols with substituents in the 2-, 4- and 6-positions.
Succonox 12 is N-lauroyl-p-aminophenol.
AO 2246 is 2,2-methylene-bis(4-methyl-6-t-butylphenol).

TABLE

| Stabilizer | After Oven Aging | | After Light Aging, Color |
|---|---|---|---|
| | Color | Gel (percent) | |
| 0.2 DBPC | Yel Orange | 20.6 | Lt Yel. |
| 0.2 DBPC, 1.0 DDPP | Lt Yel | 19.2 | Tr Lt Yel. |
| 0.5 Cyanox LF, 0.2 DBPC | Yel | 55.0 | Tr Yel to WW. |
| 0.5 Cyanox LF, 0.2 DBPC, 1.0 DDPP | WW | 0 | Tr Yel to WW. |
| 1.0 DuPont Zalba, 0.2 DBPC | Yel | 34.2 | Tr Yel to WW. |
| 0.5 DuPont Zalba, 0.2 DBPC, 1.0 DDPP | Sl Gr | 0 | Tr Yel to WW. |
| 0.5 Wingstay T, 0.2 DBPC | Lt Yel; fusing | 49.0 | Al WW. |
| 0.5 Wingstay T, 0.2 DBPC, 1.0 DDPP | Lt Yel Gr | 0.57 | Tr Lt Yel Gr. |
| 1.0 Wingstay T, 0.5 DDPP | V Lt Yel Cr | 3.0 | V Lt Yel. |
| 1.0 Wingstay T, 0.2 DPBC | V Lt Yel; partly melted | 0 | Al WW. |
| 0.5 AO 80, 0.2 DBPC | Brown | 32.1 | WW. |
| 0.5 AO 80, 0.2 DBPC, 1.0 DDPP | Al WW | 0.62 | Al WW. |
| 0.5 Nonox WSL, 0.2 DBPC | Yel; fusing | 48.3 | WW. |
| 0.5 Nonox WSL, 0.2 DBPC, 1.0 DDPP | V Lt Yel; fusing | 0.92 | WW. |
| 0.5 Succonox 12, 0.2 DBPC | Dk Yel | 49.3 | WW. |
| 0.5 Succonox 12, 0.2 DBPC 1.0 DDPP | V Lt Cr | 0.77 | WW. |
| 0.5 AO 2246, 0.2 DBPC | Yel Br | 48.1 | Tr Lt Yel. |
| 0.5 AO 2246, 0.2 DBPC, 1.0 DDPP | Al WW | 0.80 | V Sl Tr Lt Yel. |

The table shows that the synergistic mixtures employing these particular materials in the amounts claimed give satisfactory results.

What I claim is:

1. Polybutadiene having incorporated therein 0.15 to 2.5 parts of a stabilizer mixture per 100 parts of the polymer, the polymer being stereolinear due to polymerization with a lithium-based catalyst and exhibiting by infra-red technique substantially 30 to 40 percent of cis-1,4-structure and substantially 6 to 15 percent, 1,2-structure, the balance being trans-1,4-structure;

the stabilizer mixture being composed of 0.05 to 0.5 part of Component 1 which has the formula

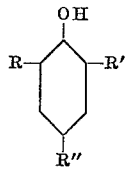

in which
R is an aliphatic hydrocarbon radical containing 1 to 12 carbon atoms,
R' is an aliphatic hydrocarbon radical containing 4 to 12 carbon atoms of the class consisting of tertiary-alkyl and alicyclic radicals, and
R'' is an n-alkyl radical containing 1 to 4 carbon atoms, 0.05 to 1 part of Component 2 which is a phosphite of the formula

in which
R is an alkyl group containing 4 to 12 carbon atoms;
R' is from the class consisting of phenyl and mono-alkylphenyl in which the alkyl group contains 1 to 4 carbon atoms; and
R'' is from the class consisting of alkyl groups containing 4 to 12 carbon atoms, phenyl and mono-alkylphenyl in which the alkyl group contains 1 to 4 carbon atoms, and 0.05 to 1 part of Component 3 is from the class consisting of (a) compounds of the class having the formula

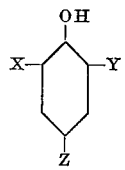

in which
X is a primary or secondary phenylalkyl radical having 1 to 3 carbon atoms in the alkyl group,
Y is a tertiary-alkyl radical having 4 to 12 carbon atoms, and
Z is a primary or secondary alkyl radical having 1 to 4 carbon atoms, (b) compounds having the formula

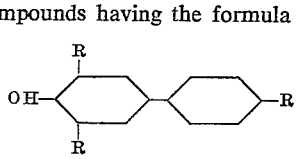

in which each R is a tertiary-alkyl group of 4 to 12 carbon atoms, (c) a mixture of compounds, each having the formula

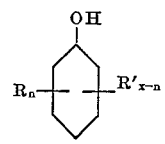

in which
$x$ is selected from the group consisting of 2 and 3,
$n$ is selected from the group consisting of 0, 1, 2 and 3, but does not exceed the value of $x$,
R is selected from the group consisting of t-butyl and t-amyl, and
R' is selected from the group consisting of t-octyl and t-nonyl,
R and R' being attached to the benzene ring in the 2-, 4- and 6-positions; and a major portion of said mixture being composed of tri-t-alkylated phenols in which two of said three alkyl groups are selected from the class consisting of t-octyl and t-nonyl groups, and in which the third t-alkyl group is selected from the class consisting of t-butyl and t-amyl groups.

(d) compounds having the formula

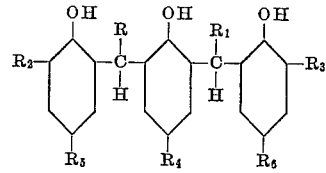

in which
R and $R_1$ are from the class consisting of hydrogen and alkyl groups containing 1 to 3 carbon atoms,
$R_2$ and $R_3$ are each a t-alkyl group consisting of 4 to 12 carbon atoms,
$R_4$ is from the class consisting of hydrogen and alkyl groups containing 1 to 4 carbon atoms, and
$R_5$ and $R_6$ are each an alkyl group containing 1 to 4 carbon atoms, (e) compounds of the class consisting of cyclohexylated, cyclopentylated, alpha-methylcyclohexylated and alpha-methylcyclopentylated phenols, cresols and xylenols having substituents in substantially all of the 2-, 4- and 6-positions, (f) N-acyl-p-aminophenols in which the acyl group contains 4 to 18 carbon atoms, and (g) compounds having the formula

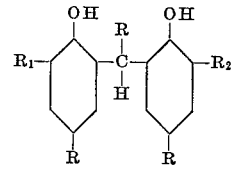

in which
R is from the class consisting of hydrogen and alkyl groups containing 1 to 3 carbon atoms,
$R_1$ and $R_2$ are each a t-alkyl group containing 4 to 12 carbon atoms, and
$R_3$ and $R_4$ are each an alkyl group containing 1 to 4 carbon atoms.

2. The stabilized polybutadiene of claim 1 which contains di-t-butyl-p-cresol.

3. The stabilized polybutadiene of claim 1 which contains didecyl phenyl phosphite.

4. The stabilized polybutadiene of claim 1 which contains Component 3(a).

5. The stabilized polybutadiene of claim 1 which contains Component 3(b).

6. The stabilized polybutadiene of claim 1 which contains Component 3(c).

7. The stabilized polybutadiene of claim 1 which contains Component 3(d).

8. The stabilized polybutadiene of claim 1 which contains Component 3(e).

9. The stabilized polybutadiene of claim 1 which contains Component 3(f).

10. The stabilized polybutadiene of claim 1 which contains Component 3(g).

11. The stabilized polybutadiene of claim 1 which contains di-t-butyl-p-cresol and didecyl phenyl phosphite.

12. The stabilized polybutadiene of claim 2 which contains Component 3(a).

13. The stabilized polybutadiene of claim 2 which contains Component 3(b).

14. The stabilized polybutadiene of claim 2 which contains Component 3(c).

15. The stabilized polybutadiene of claim 2 which contains Component 3(d).

16. The stabilized polybutadiene of claim 2 which contains Component 3(e).

17. The stabilized polybutadiene of claim 2 which contains Component 3(f).

18. The stabilized polybutadiene of claim 2 which contains Component 3(g).

19. The stabilized polybutadiene of claim 11 which contains Component 3(a).

20. The stabilized polybutadiene of claim 11 which contains Component 3(b).

21. The stabilized polybutadiene of claim 11 which contains Component 3(c).

22. The stabilized polybutadiene of claim 11 which contains Component 3(d).

23. The stabilized polybutadiene of claim 11 which contains Component 3(e).

24. The stabilized polybutadiene of claim 11 which contains Component 3(f).

25. The stabilized polybutadiene of claim 11 which contains Component 3(g).

References Cited

UNITED STATES PATENTS

| | | | |
|---|---|---|---|
| 2,819,329 | 1/1958 | Sullivan et al. | 260—45.95 |
| 2,999,841 | 9/1961 | Csendes | 260—45.95 |
| 3,006,888 | 10/1961 | Reynolds | 260—45.95 |
| 3,080,338 | 3/1963 | Nudemberg et al. | 260—45.95 |
| 3,093,587 | 6/1963 | Ecke et al. | 260—45.95 |
| 3,177,166 | 4/1965 | Gregory et al. | 260—45.95 |

DONALD E. CZAJA, *Primary Examiner.*

LEON J. BERCOVITZ, *Examiner.*

H. E. TAYLOR, *Assistant Examiner.*